United States Patent
Maehara et al.

(10) Patent No.: US 8,263,900 B2
(45) Date of Patent: Sep. 11, 2012

(54) LASER BEAM PROCESSING MACHINE

(75) Inventors: Jun Maehara, Tsurumi-ku (JP); Yukio Morishige, Ota-ku (JP)

(73) Assignee: Disco Corporation, Tokyo (JP)

( * ) Notice: Subject to any disclaimer, the term of this patent is extended or adjusted under 35 U.S.C. 154(b) by 276 days.

(21) Appl. No.: 12/853,797

(22) Filed: Aug. 10, 2010

(65) Prior Publication Data
US 2011/0042362 A1    Feb. 24, 2011

(30) Foreign Application Priority Data
Aug. 21, 2009   (JP) ................................. 2009-191717

(51) Int. Cl.
*B23K 26/00*   (2006.01)
(52) U.S. Cl. ............................................. 219/121.67
(58) Field of Classification Search .............. 219/121.67
See application file for complete search history.

(56) References Cited

U.S. PATENT DOCUMENTS

| | | | |
|---|---|---|---|
| 7,990,516 B2* | 8/2011 | Takaiwa et al. ................. | 355/30 |
| 8,054,447 B2* | 11/2011 | Nagasaka et al. ............... | 355/53 |
| 8,085,385 B2* | 12/2011 | Kanaya .......................... | 355/72 |
| 2009/0041854 A1* | 2/2009 | Markert ........................ | 424/580 |
| 2009/0122285 A1* | 5/2009 | Kanaya .......................... | 355/53 |

FOREIGN PATENT DOCUMENTS

| JP | 10-305421 | 11/1998 |
|---|---|---|
| JP | 2006-255769 | 9/2006 |

* cited by examiner

*Primary Examiner* — William D Coleman
(74) *Attorney, Agent, or Firm* — Greer, Burns & Crain, Ltd.

(57) ABSTRACT

A laser beam processing machine is provided which includes a laser beam irradiation unit including a laser beam oscillation unit and a processing head provided with a condenser lens condensing a laser beam oscillated from the laser beam oscillation unit. The processing head includes a liquid column forming mechanism provided with a jet nozzle adapted to jet liquid along an optical path for the laser beam condensed by the condenser lens, and a water droplet suction mechanism disposed below the liquid column forming mechanism and provided with an insertion passage through which a liquid column jetted from the jet nozzle is passed and with an annular suction port formed to surround the insertion passage and communicate with suction means.

4 Claims, 4 Drawing Sheets

LASER BEAM PROCESSING MACHINE

BACKGROUND OF THE INVENTION

1. Field of the Invention

The present invention relates to a laser beam processing machine that emits a laser beam along a liquid column jetted from a jet nozzle to perform laser processing on a workpiece.

2. Description of the Related Art

In the production process of a semiconductor device, a plurality of areas are sectioned by predetermined dividing lines called streets which are arranged in a lattice pattern on the front surface of a substantially disk-like semiconductor wafer, and a device such as IC or LSI is formed in each of the sectioned areas. Individual semiconductor devices are manufactured by cutting the semiconductor wafer along the streets to divide it into the areas in which the devices are formed.

The following method has recently been proposed as a method of dividing a plate-like workpiece such as a semiconductor wafer or the like. A pulse laser beam is directed along streets formed on a workpiece to form laser-processed grooves. Then, the workpiece is fractured along the laser-processed grooves by a mechanical breaking device. (See e.g. Japanese Patent Laid-Open No. Hei 10-305421.)

The laser beam processing machine is used to direct a laser beam along the streets of the semiconductor wafer for formation of the laser-processed grooves. In such a case, the irradiation of the semiconductor wafer with a laser beam causes debris, which adheres to the front surface of the device. This poses a problem of degrading the quality of the device. To eliminate such a problem, when the laser-processed grooves are to be formed along the streets of the semiconductor wafer, the front surface of the semiconductor wafer is coated with a protective coating film and a laser beam is directed to the semiconductor wafer via the protective coating film. However, since the step of applying the protective coating film on the front surface of the semiconductor wafer has to be added, productivity is poor. In addition, since the irradiation of the semiconductor with a laser beam heats the device, there arises a problem of degrading the quality of the device.

The following method is proposed as a laser beam processing method that eliminates the influence of debris caused by the irradiation of a laser beam and also prevents the heating of a workpiece such as a wafer or the like. A string-like liquid column is jetted from a jet nozzle and a laser beam is directed along the liquid column. This laser beam processing method leads the collected laser beam to the workpiece via the string-like liquid column. Therefore, this method has a merit capable of laser beam processing regardless of the focal position of the collecting lens and an advantage in which the degradation of the quality of a workpiece such as a wafer or the like due to heat can be prevented because heat occurring during laser beam processing is cooled. (See e.g. Japanese Patent Laid-Open No. 2006-255769.)

SUMMARY OF THE INVENTION

However, there is a problem as below. The liquid column jetted from the jet nozzle collides against and is splashed by the front surface of the workpiece held by the chuck table. The splashed water droplets adhere to the lower surface of the jet nozzle, and grow, drop and come into contact with the liquid column. This poses a problem in that the liquid column is made turbulent to deflect the pulse laser beam, so that the pulse laser beam cannot precisely be directed to a predetermined position.

Accordingly, it is an object of the present invention to provide a laser beam processing machine that prevents the deflection of a laser beam directed along a liquid column jetted from a jet nozzle.

In accordance with an aspect of the present invention, there is provided a laser beam processing machine including a chuck table holding a workpiece; laser beam irradiation means for directing a laser beam to the workpiece held by the chuck table; and processing-transfer means for processing-transferring the chuck table and laser beam irradiation means in a relative manner; wherein the laser beam irradiation means includes laser beam oscillation means and a processing head having a condenser lens condensing a laser beam oscillated from the laser beam oscillation means, and the processing head includes a liquid column forming mechanism provided with a jet nozzle adapted to jet liquid along an optical path for the laser beam condensed by the condenser lens, and a water droplet suction mechanism disposed below the liquid column forming mechanism and provided with an insertion passage through which a liquid column jetted from the jet nozzle is passed and with an annular suction port formed to surround the insertion passage and communicate with suction means.

The water droplet suction mechanism includes a bottom wall provided with a first insertion passage through which the liquid column jetted from the jet nozzle is passed; an annular side wall formed to extend upright from the outer circumference of the bottom wall and to be fitted to the lower end portion of the liquid column forming mechanism; a first cylindrical body formed to project from the lower surface of the bottom wall and provided with a second insertion passage through which the liquid column jetted from the jet nozzle is passed; and a second cylindrical body disposed to surround the first cylindrical body so as to define an annular suction port between the outer circumferential surface of the first cylindrical body and the second cylindrical body, the annular suction port communicating with the suction means.

Preferably, respective lower surfaces of first and second cylindrical bodies are each formed to be tilted downward from an inner circumference toward an outer circumference to form a tapered surface. In addition, preferably, an annular support shelf is provided at an outer circumferential portion of an upper surface of the bottom wall constituting part of the water droplet suction mechanism and an outside air introduction chamber is defined between a lower surface of the liquid column forming mechanism fitted to the annular side surface and the upper surface of the bottom wall.

The laser beam processing machine according to the present invention includes the water droplet suction mechanism disposed below the liquid column forming mechanism constituting part of the processing head and provided with the insertion passage through which a liquid column jetted from the jet nozzle is passed and with the annular suction port formed to surround the insertion passage and communicate with suction means. In this way, the liquid column jetted from the jet nozzle collides against and are splashed by the front surface of the workpiece held by the chuck table. The splashed water droplets adhere to the lower surface of the water droplet suction mechanism. However, the water droplets are sucked and removed through the annular suction port. Thus, the water droplets will not adhere to the liquid column jetted from the jet nozzle to deflect the laser beam, so that the laser beam can precisely be directed to a predetermined position.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
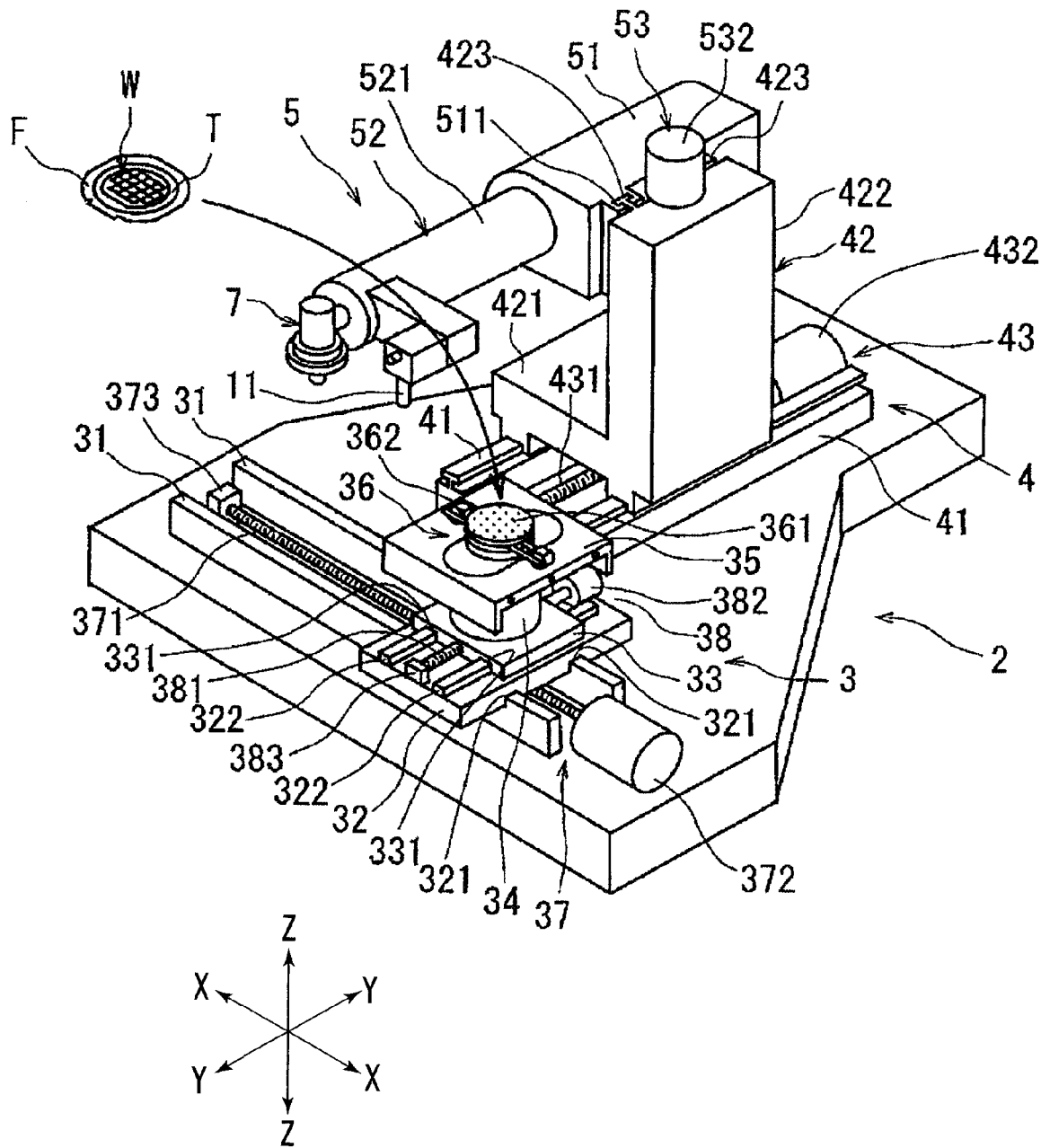
FIG. 1 is a perspective view of a laser beam processing machine configured according to the present invention.

Preferred embodiments of a laser beam processing machine configured according to the present invention will hereinafter be described in detail with reference to the accompanying drawings. FIG. 1 illustrates a perspective view of the laser beam processing machine configured according to the present invention. The laser beam processing machine illustrated in FIG. 1 includes a stationary base 2; a chuck table mechanism 3; a laser beam irradiation unit support mechanism 4; and a laser beam irradiation unit 5. The chuck table mechanism 3 is disposed on the stationary base 2 shiftably in a processing-transfer direction (X-axial direction) denoted with arrow X so as to hold a workpiece. The laser beam irradiation unit support mechanism 4 is disposed on the stationary base 2 shiftably in an indexing-transfer direction (Y-axial direction) denoted with arrow Y perpendicular to the X-axial direction. The laser beam irradiation unit 5 disposed on the laser beam irradiation unit support mechanism 4 shiftably in a focal position adjusting direction (Z-axial direction) denoted with arrow Z.

The chuck table mechanism 3 includes a pair of guide rails 31, 31 disposed on the stationary base 2 in parallel to each other to extend in the X-axial direction; a first slide block 32 disposed on the guide rails 31, 31 shiftably in the X-axial direction; a second slide block 33 disposed on the first slide block 32 shiftably in the Y-axial direction; a cover table 35 supported on the second slide block 33 by a cylindrical member 34; and a chuck table 36 as workpiece holding means. The chuck table 36 is equipped with a suction chuck 361 formed of a porous material. The chuck table 36 is designed to hold on the suction chuck 361 e.g. a disklike wafer, a workpiece by suction means not illustrated. The chuck table 36 configured as above is rotated by a pulse motor, not illustrated, disposed in the cylindrical member 34. Incidentally, the chuck table 36 is provided with clamps 362 used to secure an annular frame supporting the wafer via a protection tape as described later.

The first slide block 32 is provided on the lower surface thereof with a pair of guided grooves 321, 321 fitted to the pair of guide rails 31, 31 and on the upper surface thereof with a pair of guide rails 322, 322 formed parallel to each other to extend in the Y-axial direction. The first slide block 32 configured as above is configured shiftably along the pair of guide rails 31, 31 in the X-axial direction because the guided grooves 321, 321 are fitted to the pair of guide rails 31, 31. The chuck table mechanism 3 illustrated in the embodiment is equipped with processing-transfer means 37 adapted to shift the first slide block 32 along the pair of guide rails 31, 31 in the X-axial direction. The processing-transfer means 37 includes an external thread rod 371 disposed between and parallel to the pair of guide rails 31, 31; and a drive source such as a pulse motor 372 or the like adapted to turnably drive the external thread rod 371. The external thread rod 371 has one end turnably supported by a bearing block 373 secured to the stationary base 2 and the other end transmittably connected to the output shaft of the pulse motor 372. Incidentally, the external thread rod 371 is threadedly engaged with a through-internal thread hole formed in an internal thread block, not illustrated, provided to project from the central lower surface of the first slide block 32. In this way, the first slide block 32 is shifted in the X-axial direction along the guide rails 31, 31 by the pulse motor 372 normally or reversely driving the external thread rod 371.

The second slide block 33 is provided on the lower surface with a pair of guided grooves 331, 331 fitted to the pair of guide rails 322, 322 provided on upper surface of the first slide block 32. The second slide block 33 is configured to be shiftable in the Y-axial direction by the guided grooves 331, 331 fitted to the pair of guide rails 322, 322. The chuck table mechanism 3 illustrated in the embodiment is equipped with first indexing-transfer means 38 adapted to shift the second slide block 33 in the Y-axial direction along the pair of guide rails 322, 322 provided on the first slide block 32. The first indexing-transfer means 38 includes an external thread rod 381 disposed between and parallel to the pair of guide rails 322, 322, and a drive source such as a pulse motor 382 or the like adapted to turnably drive the external thread rod 381. The external thread rod 381 has one end turnably supported by a bearing block 383 secured to the upper surface of the first slide block 32 and the other end transmittably connected to the output shaft of the pulse motor 382. Incidentally, the external thread rod 381 is threadedly engaged with a through-internal thread hole formed in an internal screw block, not illustrated, provided to project from the central lower surface of the second slide block 33. In this way, the second slide block 33 can be shifted in the Y-axial direction along the guide rails 322, 322 by the pulse motor 382 normally or reversely turning the external thread rod 381.

The laser beam irradiation unit support mechanism 4 includes a pair of guide rails 41, 41 disposed on the stationary base 2 in parallel to each other to extend in the Y-axial direction; and a movable support base 42 disposed on the guide rails 41, 41 shiftably in the direction denoted with arrow Y. The movable support base 42 includes a shift support portion 421 shiftably disposed on the guide rails 41, 41; and an attachment portion 422 attached to the shift support portion 421. The attachment portion 422 is provided on one side surface with a pair of guide rails 423, 423 extending parallel to each other in the Z-axial direction. The laser beam irradiation unit support mechanism 4 illustrated in the embodiment is equipped with second indexing-transfer means 43 adapted to shift the movable support base 42 along the pair of guide rails 41, 41 in the Y-axial direction. The second indexing-transfer means 43 includes an external thread rod 431 disposed between and parallel to the pair of guide rails 41, 41, and a drive source such as a pulse motor 432 or the like used to turnably drive the external thread rod 431. The external thread rod 431 has one end turnably supported by a bearing block, not illustrated, secured to the stationary base 2 and the other end transmittably connected to the output shaft of the pulse motor 432. Incidentally, the external thread rod 431 is threadedly engaged with an internal thread hole formed in an internal thread block, not illustrated, provided to extend from a central lower surface of a shift support portion 421 constituting part of the movable support base 42. In this way, the movable support base 42 is shifted in the Y-axial direction along the guide rails 41, 41 by the pulse motor 432 normally and reversely turning the external thread rod 431.

The laser beam irradiation unit 5 includes a unit holder 51, and laser beam irradiation means 52 attached to the unit holder 51. The unit holder 51 is provided with a pair of guided grooves 511, 511 slidably fitted to the pair of guide rails 423, 423 provided on the attachment portion 422. The unit holder 51 is supported shiftably in the Z-axial direction by the guided grooves 511, 511 fitted to the respective guide rails 423, 423.

The laser beam irradiation unit 5 is provided with shifting means 53 adapted to shift the unit means 51 along the pair of guide rails 423, 423 in the Z-axial direction. The shifting means 53 includes an external thread rod (not illustrated) between the pair of guide rails 423, 423, and a drive source such as a pulse motor 532 adapted to turnably drive the external thread rod. The shifting means 53 shifts the unit holder 51 and the laser beam irradiation means 52 along the guide rails 423, 423 in the Z-axial direction by the pulse motor 532 normally and reversely turning the external thread rod not illustrated. Incidentally, in the illustrated embodiment, the laser beam irradiation means 52 is shifted upward by normally driving the pulse motor 532 and shifted downwardly by reversely driving the pulse motor 532.

The laser beam irradiation means 52 is described with reference to FIGS. 1 and 2. The laser beam irradiation means 52 includes a cylindrical casing 521 secured to the unit holder 51 and extending substantially horizontally; pulse laser beam oscillation means 6 disposed in the casing 521; and a processing head 7 disposed at the leading end of the casing 521 and collecting the laser beam oscillated from the laser beam oscillation means 6. The pulse laser beam oscillation means 6 includes a pulse laser beam oscillator 61 composed of a YAG laser oscillator or an YVO4 laser oscillator; and cyclic frequency setting means 62 attached to the pulse laser beam oscillator 61. The pulse laser beam oscillation means 6 configured as described above oscillates a pulse laser beam having e.g. a wavelength of 532 nm, a cyclic frequency of 40 kHz and an average output of 10 W.

Figure 2:
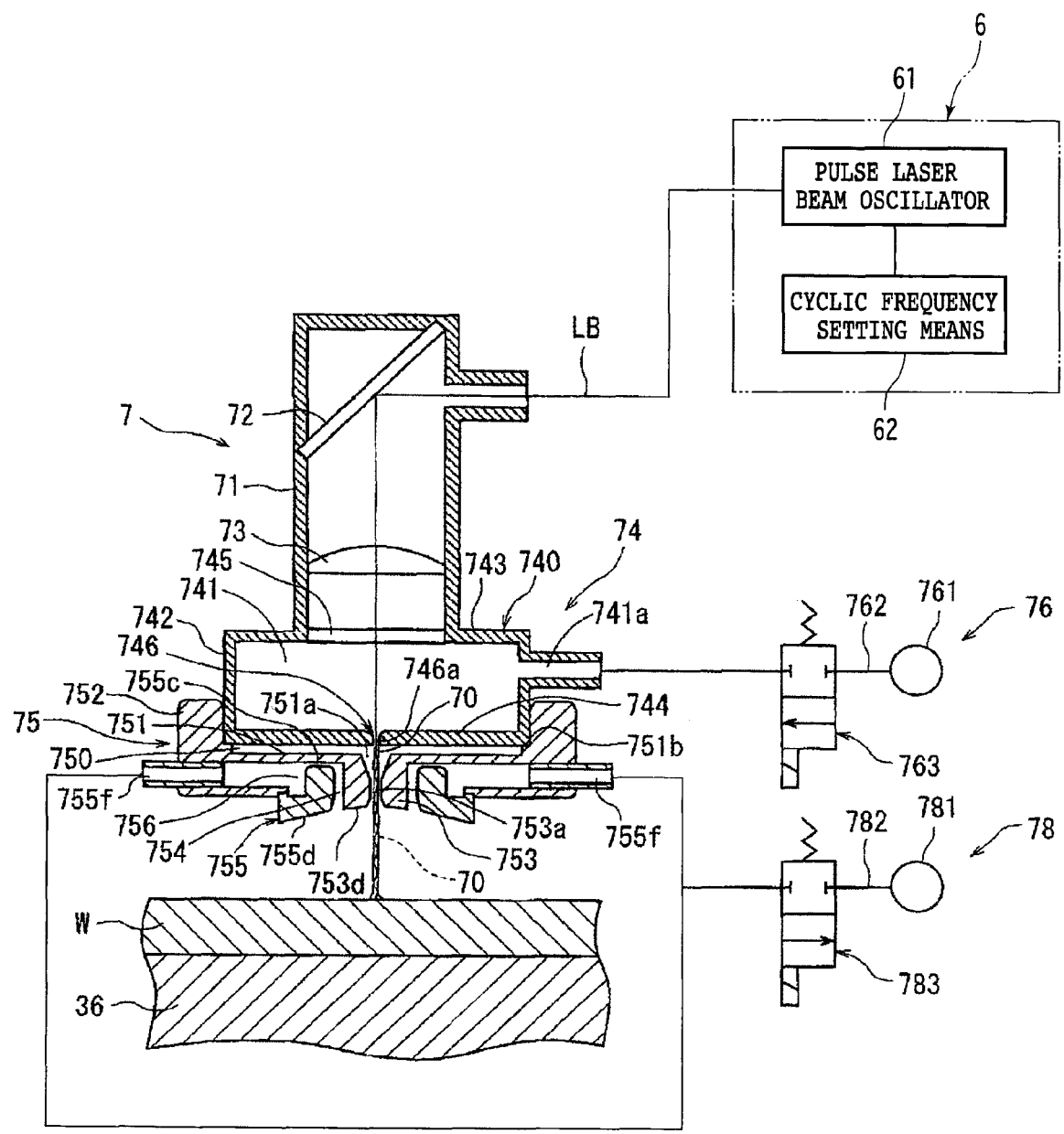
FIG. 2 is a configurational block diagram of pulse laser beam irradiation means installed in the laser beam machine illustrated in FIG. 1.

Referring to FIG. 2, the processing head 7 includes a head housing 71; a direction-changing mirror 72 disposed in the head housing to direction-change downwardly a laser beam oscillated from the pulse laser beam oscillation means 6; and a collecting lens 73 collecting the laser beam direction-changed by the direction-changing mirror 72. A liquid column forming mechanism 74 is disposed below the head housing 71 and a water droplet suction mechanism 75 below the liquid column forming mechanism 74.

The liquid column forming mechanism 74 disposed below the head housing 71 includes a liquid chamber forming housing 740 forming a liquid chamber 741. The liquid chamber forming housing 740 is composed of a cylindrical side wall 742, and an upper wall 743 and a lower wall 744 closing an upper surface and a lower surface, respectively, of the side wall 742. A transparent plate 745 is disposed in the upper wall 743 constituting part of the liquid chamber forming housing 740. The circular lower wall 744 constituting part of the liquid chamber forming housing 740 is formed with a jet nozzle 746 at a central portion thereof. Incidentally, a focal point of the condenser lens 73 is positioned at a jet port 746a of the injection nozzle 746 and the jet port 746a is formed on an optical path of a laser beam.

The side wall 742 constituting part of the liquid chamber forming housing 740 is formed with a liquid introduction port 741a communicating with the liquid chamber 741. The liquid introduction port 741a is connected to liquid supply means 76. The liquid supply means 76 includes a source 761 adapted to supply liquid such as water or the like, a pipe 762 and an electromagnetic on-off valve 763 disposed in the pipe 762.

The pipe 762 connects the liquid supply source 761 with the liquid introduction port 741a provided in the side wall 742 constituting part of the liquid chamber forming housing 740. The electromagnetic on-off valve 763 is configured to disconnect the communication between the liquid supply source 761 and the liquid introduction port 741a during de-energization (OFF) and to connect the communication between the liquid supply source 751 and the liquid introduction port 741a during energization (ON). Incidentally, the liquid supply means 76 configured as described above supplies liquid having a pressure of e.g. 13 MPa to the liquid chamber 741 through the liquid introduction port 741a. The liquid supplied to the liquid chamber 741 by the liquid supply means 76 is jetted from the jet port 746a of the injection nozzle 746, being formed as a liquid column 70, toward the water droplet suction mechanism 75 which will be described later. Incidentally, a diameter of the liquid column 70 is set at 0.05 mm in the illustrated embodiment.

The water droplet suction mechanism 75 disposed below the liquid column forming mechanism 74 includes a bottom wall 751, an annular side wall 752, a first cylindrical body 753, and a second cylindrical body 755. The bottom wall 751 is provided with a first insertion passage 751a through which the liquid column 70 jetted from the jet nozzle 746 is passed. The annular side wall 752 is formed to extend upright from the outer circumference of the bottom wall 751 and to be fitted to the lower end portion of the liquid chamber forming housing 740 constituting part of the liquid column forming mechanism 74. The first cylindrical body 753 is formed to project from the lower surface of the bottom wall 751 and is provided with a second insertion passage 753a through which the liquid column 70 jetted from the jet nozzle 746 is passed. The second cylindrical body 755 is disposed to surround the first cylindrical body 753 so as to define an annular suction port 754 between the outer circumferential surface of the first cylindrical body 753 and the second cylindrical body 755. These component parts are made of stainless steel in the illustrated embodiment. The bottom wall 751 constituting part of the water droplet suction mechanism 75 is provided with an annular support shelf 751b at an upper surface outer circumferential portion thereof. In this way, the annular side wall 752 constituting part of the water droplet mechanism 75 is fitted to the lower end of the liquid chamber forming housing 740 constituting the liquid column forming mechanism 74. The lower end of the liquid chamber forming housing 740 comes into contact with the annular support shelf 751b to define an outside air introduction chamber 750 between the lower surface of the liquid chamber forming housing 740 and the upper surface of the bottom wall 751.

Figure 3:
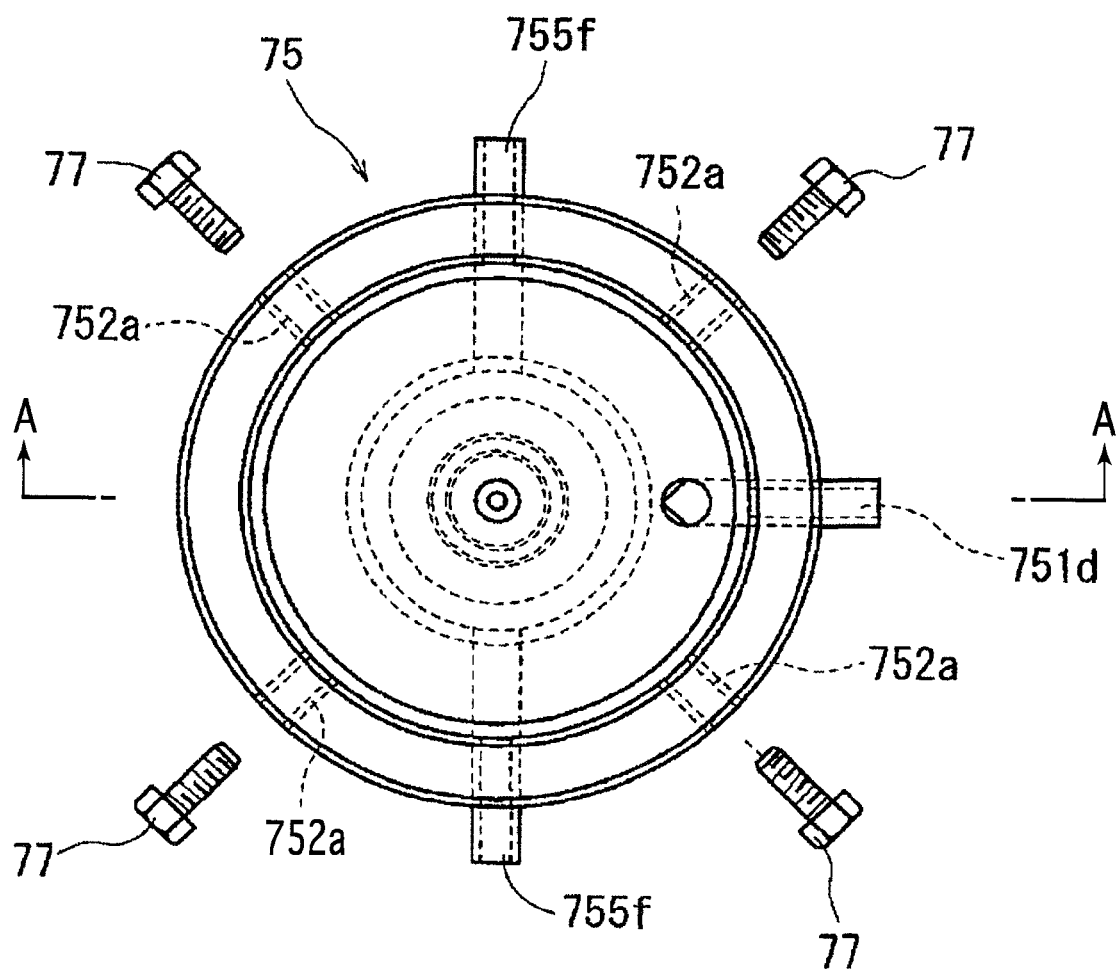
FIG. 3 is a plan view of a water droplet suction mechanism constituting a processing head constituting part of pulse laser beam irradiation means illustrated in FIG. 2.

Referring to FIG. 3, the annular side surface 752 constituting part of the water droplet suction mechanism 75 is formed with four internal thread holes 752a at 90° intervals. Fastening bolts 77 are threadedly engaged with the four respective internal thread holes 752a. In this way, the annular side wall 752 is fitted to the lower end portion of the liquid chamber forming housing 740 constituting part of the liquid column forming mechanism 74 and the fastening bolts 77 are threadedly engaged with and fastened to the four respective internal thread holes 752a. Thus, the water droplet suction mechanism 75 is attached to the lower end portion of the liquid chamber forming housing 740. Incidentally, an alternative configuration to the attachment structure of the water droplet suction mechanism 75 to the lower end portion of the liquid chamber forming housing 740 may be as below. The annular side wall 752 is formed with internal threads in the inner circumferential surface thereof. In addition, also the liquid chamber forming housing 740 is formed with external threads in the outer circumferential surface of the lower end portion thereof. The internally threads formed in the inner circumferential surface of the annular side wall 752 are threadedly engaged with the respective external threads formed in the outer circumferential surface of the lower end portion of the liquid chamber forming housing 740.

Figure 4:
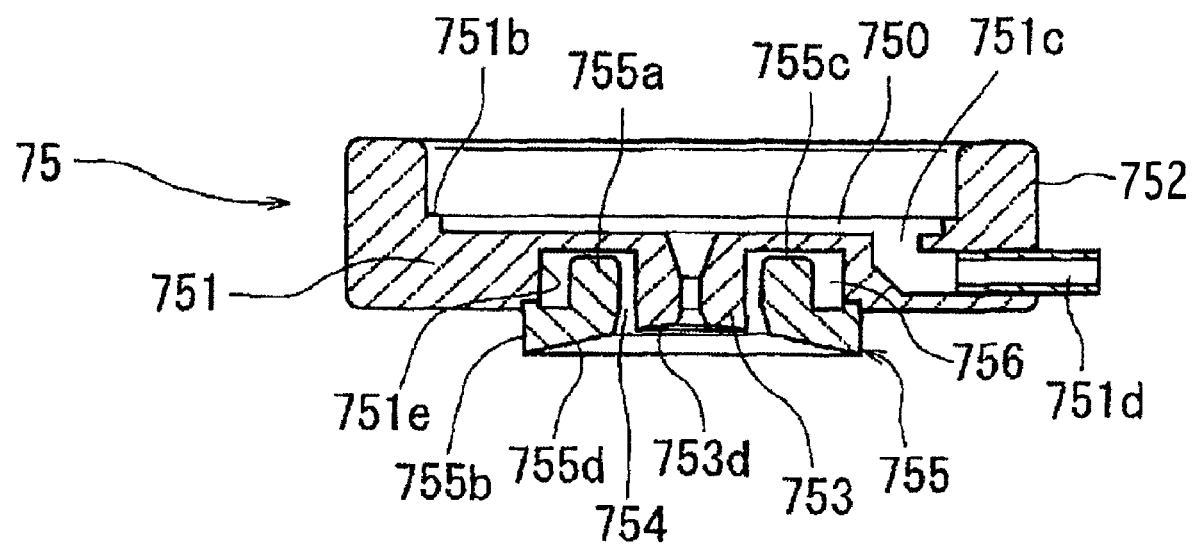
FIG. 4 is a cross-sectional view of the water droplet suction mechanism illustrated in FIG. 3, taken along line A-A thereof.

Referring to FIG. 4, the bottom wall 751 constituting part of the water droplet suction mechanism 75 is provided with an outside air introduction port 751c communicating with the outside air introduction chamber 750 and an outside air introduction passage 751d adapted to allow the outside air introduction port 751c to communicate with the outside air. The bottom wall 751 is formed at the central portion of the lower surface with a recessed portion 751e forming a negative pressure chamber 756. The second cylindrical body 755 is disposed in the recessed portion 751e to surround the first cylindrical body 753 to define the annular suction port 754 between the outer circumferential surface of the first cylindrical body 753 and the second cylindrical body 755. The cylindrical body 755 is composed of a cylindrical part 755a and a flange part 755b. The cylindrical part 755a has an inner diameter greater than an outer diameter of the first cylindrical body 753. The flange part 755b is disposed at the lower end of the cylindrical part 755a so as to project radially and outwardly therefrom. The outer circumferential portion of the flange portion 755b is joined by welding to the circumferential edge portion of the bottom wall 751 forming the recessed portion 751e. This defines a gap 755c between the upper end surface of the cylindrical part 755a constituting part of the second cylindrical body 755 attached to the bottom wall 751 and the bottom surface of the recessed portion 751e formed in the bottom wall 751.

Respective lower surfaces of the first and second cylindrical bodies 753, 755 formed as described above are formed as corresponding tapered surfaces 753d and 755d tilted downwardly from the inner circumference toward the outer circumference. Incidentally, as illustrated in FIGS. 2 and 3, the bottom wall 751 constituting part of the water droplet suction mechanism 75 is formed with the plurality of suction passages 755f communicating with the negative pressure chamber 756 formed by the recessed portion 751e. Two of the suction passages 755f are provided in the illustrated embodiment at respective equiangular positions (positions at 180° with each other in the illustrated embodiment). The suction passages 755f formed as described above are allowed to communicate with the suction means 78.

The suction means 78 includes a suction source 781, a pipe 782 connecting the suction source 781 with the suction passage 755f, and an electromagnetic on-off valve 783 disposed in the pipe 782. The electromagnetic on-off valve 783 is configured to disconnect the communication between the suction source 781 and the suction passage 755f during de-energization (OFF) and to connect the communication between the suction source 781 and the suction passage 755f during energization (ON). In this way, if the electromagnetic on-off valve 783 is energized (ON) to establish the communication between the suction source 781 and the suction passage 755f, a negative pressure is applied to the negative pressure chamber 756 and to the annular suction port 754 between the outer circumferential surface of the first cylindrical body 753 and the inner circumferential surface of the cylindrical part 755a constituting part of the second cylindrical body 755 via the gap 755c between the upper end surface of the cylindrical part 755a constitutional the second cylindrical body 755 and the bottom surface of the recessed portion 751e formed in the bottom wall 751. The suction means 78 configured as described above sucks liquid at 5 to 10 liters per minute.

Returning to FIG. 1, the description is continued. The laser beam processing machine in the illustrated embodiment includes image pickup means 11. The image pickup means 11 is disposed at the front end portion of a casing 521 to detect a process area to be subjected to laser processing by the laser beam irradiation means 52 described above. The image pickup means 11 is composed of optical means such as a microscope, a CCD camera or the like, and sends signals of an image picked up to control means not illustrated.

The laser beam irradiation means 52 in the illustrated embodiment is described as above and its operation is hereinafter described with reference to FIG. 2. Upon energization (ON) of the electromagnetic on-off valve 763 of the liquid supply means 76, high-pressure liquid is supplied from the liquid supply source 761 via the pipe 762 to the liquid chamber 740 of the liquid column forming mechanism 74 constituting part of the processing head 7. The high-pressure liquid supplied to the liquid chamber 740 is jetted as the liquid column 70 from the jet port 746a of the jet nozzle 746. The liquid column 70 is jetted toward a wafer W held by the chuck table 36 through the first insertion passage 751a formed in the bottom wall 751 constituting part of the water droplet mechanism 75 and through the second insertion passage 753a formed in the first cylindrical body 753. On the other hand, a pulse laser beam LB oscillated from the pulse laser beam oscillation means 6 is led to the condenser lens 73 by the direction-changing mirror 72. In addition, while being collected by the condenser lens 73, the pulse laser beam LB is directed along the liquid column 70 through the transparent plate 745. Thus, the pulse laser beam LB has a spot equal to the diameter of the liquid column 70.

During the laser beam irradiation described above, the electromagnetic on-off valve 783 of the suction means 78 is energized (ON) to be opened. Consequently, negative pressure is applied from the suction source 781 via the pipe 782, the suction passage 755f, the negative pressure chamber 756 and the gap 755c to the annular suction port 754. The suction passage 755f constitutes part of the water droplet suction mechanism 75. The gap 755c is defined between the upper end surface of the cylindrical part 755a constituting part of the second cylindrical body 755 and the bottom surface of the recessed portion 751e formed in the bottom wall 751. The annular suction port 754 is defined between the outer circumferential surface of the first cylindrical body 753 and the inner circumferential surface of the cylindrical part 755a constituting part of the second cylindrical body 755.

During the laser beam irradiation, the liquid column 70 jetted from the jet port 746a of the jet nozzle 746 constituting part of the liquid column forming mechanism 74 collides against and are splashed by the front surface of the wafer W held by the chuck table 36. The splashed water droplets adhere to the respective lower surfaces of the first and second cylindrical bodies 753, 755 constituting part of the water droplet suction mechanism 75. If the water droplets grow, drop and come into contact with the liquid column 70, the liquid column 70 is made turbulent to deflect the pulse laser beam LB, so that the pulse laser beam LB cannot precisely be directed to a predetermined position. However, in the laser beam processing machine in the illustrated embodiment, the negative pressure is applied to the annular suction port 754 constituting part of the water droplet suction mechanism 75 as described above. Consequently, the droplets adhering to the vicinity of the annular suction port 754 between the first and second cylindrical bodies 753, 755 are sucked and removed via the annual suction port 754. It is possible, therefore, to prevent the water droplets from dropping and coming into contact with the liquid column 70. Incidentally, the lower surface of the first cylindrical body 753 is formed as the tapered surface 753d tilted downward from the inner circumference toward the outer circumference. Therefore, the water droplets adhering to the taper surface 753d flow toward the annular suction port 754 so that they are effectively sucked and removed. Additionally, since the lower surface of the second cylindrical body 755 is formed as the tapered surface 755d tilted downward from the inner circumference to the outer circumference. In this way, the water droplets adhering to the outer circumferential portion of the tapered surface 755d flow toward the outer circumferential edge and drops. Therefore, it is ensured that the dropping water droplets can be prevented from coming into contact with the liquid column 70.

When the liquid column 70 is jetted from the jet nozzle 746 formed in the liquid chamber forming housing 740 constituting part of the liquid column forming mechanism 74, the negative pressure occurs between the liquid chamber forming housing 740 and the water droplet suction mechanism 75. However, the negative state is not present in the embodiment described above. This is because the outside air introduction chamber 750 is defined between the lower surface of the liquid chamber forming housing 740 constituting part of the liquid column forming mechanism 74 and the upper surface of the bottom wall 751 constituting part of the water droplet suction mechanism 75. In addition, the outside air introduction chamber 750 is adapted to receive outside air introduced thereinto via the outside air introduction passage 751d. Thus, it is possible to prevent an adverse effect on the liquid column 70 caused by the occurrence of the negative pressure between the liquid chamber forming housing 740 and the water droplet suction mechanism 75.

The laser beam processing machine in the illustrated embodiment is configured as above. Its operation is described below. As illustrated in FIG. 1, while being stuck to the front surface of the dicing tape T attached to the annular frame F, the semiconductor wafer W as a workpiece is conveyed onto the suction chuck 361 of the chuck table 36 and sucked and held by the suction chuck 361. Incidentally, the semiconductor wafer W is formed on a front surface with a plurality of streets in a lattice pattern and devices such as IC, LSI or the like are formed in a plurality of areas sectioned by the streets. In this way, the chuck table 36 sucking and holding the semiconductor wafer W is shifted along the guide rails 31, 31 and positioned immediately below the image pickup means 11 by the operation of the processing-transfer means 37.

After the chuck table 36 has been positioned immediately below the image pickup means 36 as described above, image processing such as pattern matching is executed for positioning between the processing head 7 and the streets formed on the semiconductor wafer W to extend in a predetermined direction, by the image pickup means 11 and the control means not illustrated to execute the alignment of the processing area (alignment step). Similarly, the alignment of a processing area is executed on streets formed on the semiconductor wafer W to extend in a direction perpendicular to the above-mentioned predetermined direction.

The alignment for the process area is performed by detecting the streets formed on the semiconductor wafer W held on the chuck table 36 as described above. Thereafter, the chuck table 36 holding the semiconductor wafer W is shifted to a process area of the laser beam irradiation means 52. Then, a predetermined street formed on the semiconductor wafer W is positioned immediately below the processing head 7. Then, the liquid supply means 76 and the pulse laser beam oscillation means 6 constituting the laser beam irradiation means 52 and the suction means 78 are operated and also the processing-transfer means 37 is operated to processing-transfer the chuck table 36 (laser processing step). Consequently, as illustrated in FIG. 2, liquid is jetted as the liquid column 70 from the jet port 746a of the jet nozzle 746 toward the wafer W held on the chuck table 36. In addition, the pulse laser beam LB oscillated from the pulse laser beam oscillation means 6 is emitted along the liquid column 70. Further, negative pressure is applied to the annular suction port 754 constituting part of the water droplet suction mechanism 75 as described above. In this way, the liquid column 70 jetted from the jet port 746a of the jet nozzle 746 collides against and are splashed by the front surface of the wafer W held by the chuck table 36. The splashed water droplets adhere to the respective lower surfaces of the first and second cylindrical bodies 753 and 755. However, the water droplets adhering to the vicinity of the annular suction port 754 between the first and second cylindrical bodies 753 and 755 are sucked and removed via the annular suction port 754. In short, the water droplets can be prevented from dropping and coming into contact with the liquid column 70. In this way, since the pulse laser beam LB emitted along the liquid column 70 will not be deflected, the semiconductor wafer W held by the chuck table 36 is precisely be laser-processed along the predetermined streets.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam processing machine comprising:
   a chuck table holding a workpiece;
   laser beam irradiation means for directing a laser beam to the workpiece held by the chuck table; and
   processing-transfer means for processing-transferring the chuck table and laser beam irradiation means in a relative manner;
   wherein said laser beam irradiation means includes laser beam oscillation means and a processing head having a condenser lens condensing a laser beam oscillated from the laser beam oscillation means, and
   said processing head includes a liquid column forming mechanism provided with a jet nozzle adapted to jet liquid along an optical path for the laser beam condensed by the condenser lens, and a water droplet suction mechanism disposed below the liquid column forming mechanism and provided with an insertion passage through which a liquid column jetted from the jet nozzle is passed and with an annular suction port formed to surround the insertion passage and communicate with suction means.

2. The laser beam processing machine according to claim 1,
   wherein the water droplet suction mechanism includes a bottom wall provided with a first insertion passage through which the liquid column jetted from the jet nozzle is passed; an annular side wall formed to extend upright from the outer circumference of the bottom wall and to be fitted to the lower end portion of the liquid column forming mechanism; a first cylindrical body formed to project from the lower surface of the bottom wall and provided with a second insertion passage through which the liquid column jetted from the jet nozzle is passed; and a second cylindrical body disposed to surround the first cylindrical body so as to define an annular suction port between the outer circumferential surface of the first cylindrical body and the second cylindrical body, the annular suction port communicating with the suction means.

3. The laser beam processing machine according to claim 2, wherein respective lower surfaces of the first and second cylindrical bodies are each formed to be tilted downward from an inner circumference toward an outer circumference to form a tapered surface.

4. The laser beam processing machine according to claim 2, wherein an annular support shelf is provided at an outer circumferential portion of an upper surface of the bottom wall constituting part of the water droplet suction mechanism and an outside air introduction chamber is defined between a lower surface of the liquid column forming mechanism fitted to the annular side surface and the upper surface of the bottom wall.

* * * * *